(No Model.)
W. DONLON.
STOCK RELEASING DEVICE.
No. 289,398. Patented Dec. 4, 1883.
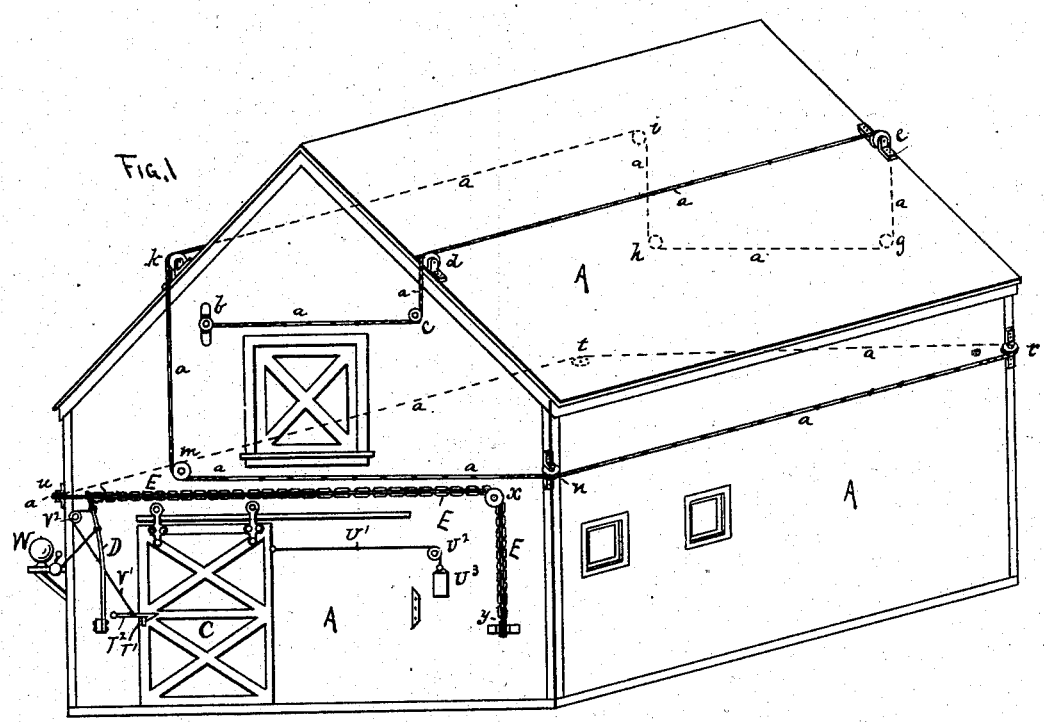
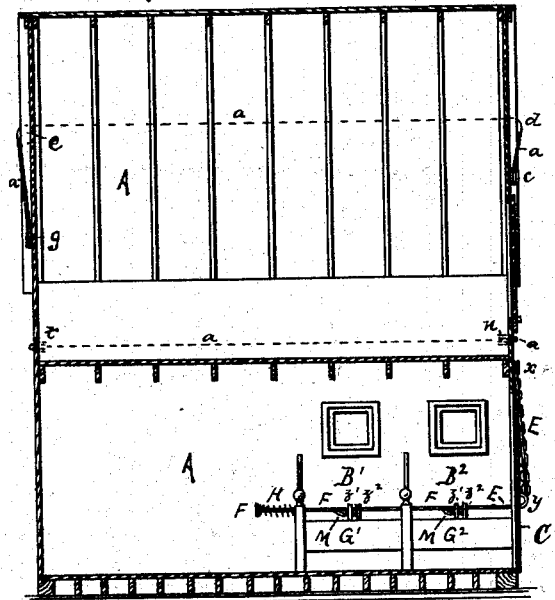
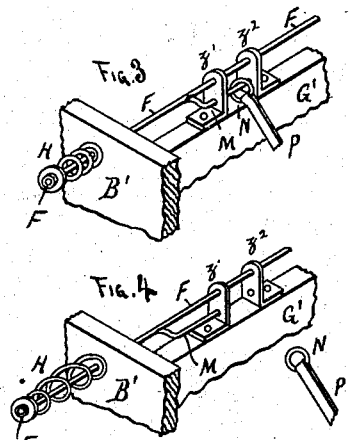
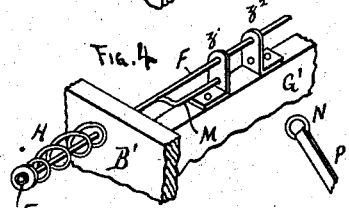
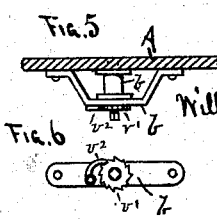
WITNESSES.
Louis Feiser Jr.
Daniel Murphy
William Donlon,
INVENTOR, BY
Louis Feiser & Leo
Atty's.

UNITED STATES PATENT OFFICE.

WILLIAM DONLON, OF EDEN PRAIRIE, MINNESOTA.

STOCK-RELEASING DEVICE.

SPECIFICATION forming part of Letters Patent No. 289,392, dated December 4, 1883.

Application filed January 11, 1883. (No model.)

*To all whom it may concern:*

Be it known that I, WILLIAM DONLON, a citizen of the United States, residing at Eden Prairie, in the county of Hennepin and State of Minnesota, have invented certain new and useful Improvements in Automatic Stock-Releasing and Alarm Attachments to Barns, &c., of which the following specification is a full, clear, and exact description, reference being also had to the accompanying drawings, in which—

Figure 1 is a perspective view of a barn, showing the manner of applying my invention thereto when a portion of the apparatus is used outside and a portion inside the barn. Fig. 2 is a sectional view of the barn, showing the manner of connecting the releasing mechanism to the hitching-straps of the animals. Fig. 3 is a perspective view, enlarged, of a portion of the hitching-strap-releasing mechanism, showing a portion of the hitching-strap secured thereto; and Fig. 4 is a similar view, showing a portion of the hitching-strap released. Fig. 5 is a plan view, and Fig. 6 is a front view, enlarged, of the fusible holding-rod tightener.

The invention may be applied either to the inside or outside, or partially inside and partially outside, of barns and other places where animals are confined; and it consists in a series of rods, wires, ropes, chains, or other suitable devices provided at intervals with fusible joints adapted to be severed by fire or heat, arranged around the barn, and connected at one end to a spring, weight, or other suitable power, which the said chains, rods, or ropes are adapted to hold either compressed or extended, and connecting said spring or other power to the doors of the barn, and also to the hitching-straps or halters of the animals, whereby in the event of the barn catching fire the fusible jointed rods, ropes, &c., will be severed, release the springs, open the doors, and disconnect the animals from their stalls and leave them free to escape.

For the purpose of illustration, I have shown a barn, A, with the fusible jointed rods or chains $a$ arranged upon the outside, and with two stalls, $B'$ $B^2$, for the animals, and one large door, C. The fusible jointed rod $a$ is attached by one end to a small windlass or tightener, $b$, upon one end of the barn, and carried along around a pulley, $c$, up over another pulley, $d$, thence across the roof to another pulley, $e$, thence down around two pulleys, $g$ $h$, on the opposite end of the barn, and thence up over another pulley, $i$, and thence along the opposite side of the roof to another pulley, $k$, and thence down around pulleys $m$ $n$ $r$ $t$ $u$, and ending by being attached to the upper end of a powerful spring, D, connected to the end of the barn, alongside of the door C, the course of the fusible rod from the pulley $e$ to the pulley $k$, and also from the pulley $r$ to the pulley $u$, being shown in dotted lines, those portions of the rods $a$ being on the opposite side of barn from the point of observation of the drawings. If the part $a$ is made of a chain or rope, then it will easily run around the pulleys $c$ $d$ $e$, &c.; but if made of sections of iron rods, then small sections of chains or rope will be inserted at the points where the pulleys occur, and at the end attached to the windlass $b$.

The windlass or tightener $b$ will be provided with a ratchet, $v'$, and dog $v^2$, (see Figs. 5 and 6,) and if the windlass be revolved and the fusible rod $a$ wound upon it a short distance, the rod will be drawn around the barn and over the pulleys, and bend the spring D backward and hold it in that position by the ratchet and dog $v'$ $v^2$.

A rod, E, with sections of chains or a chain alone, will be attached to the upper end of the spring D on the opposite side from the rod $a$, and carried along over a pulley, $x$, down to another pulley, $y$, and thence through the end of the barn, and attached to the end of a rod, F, lying along the upper edge of the front of the mangers $G'$ $G^2$ of the stalls $B'$ $B^2$. This rod F passes out beyond the stalls $B'$ $B^2$, and is provided with a spring, H, by which the rod F will be drawn backward away from the pulley $y$, as hereinafter shown.

Attached to the upper parts of each of the mangers $G'$ $G^2$ are two small guides, $z'$ $z^2$, through which the rod F passes, as shown more clearly in Figs. 3 and 4.

Attached to the lower side of the rod F are two small catches or bolts, M, passing loosely through the guides $z'$ $z^2$ just beneath the rod F, as shown, so that when the rod F is drawn toward the pulley $y$ by the compression of the spring D by the windlass $b$ the small bolts M will be also drawn through the guides $z'$ $z^2$ and the spring H compressed, as shown in Figs. 2 and 3, and then when the spring D is released the spring H will draw the rod F and bolts M backward, as shown in Fig. 4.

It will be readily seen that if the ring N of a hitching-strap, P, be inserted between the guides $z'$ $z^2$, and the bolt M allowed to pass through it, when the spring D is compressed, as shown in Fig. 3, the strap will be firmly held fast to the manger, and the animal which is attached thereto secured in the stall; but when the spring D is released, the bolts M will be withdrawn by the spring H and the animals released.

Attached to the door C is a catch or lug, T', over which a hook, $T^2$, pivoted at one end to the barn A, is adapted to fall, and thus hold the door closed.

U' is a chain or cord, of non-combustible material, connected at one end to the door C, on the opposite side from the catch T' $T^2$, and passing along over a pulley, $U^2$, and ending in a weight, $U^3$, by which means the door C will be opened when the hook $T^2$ is lifted upward.

A chain or cord, of non-combustible material, V', is attached by one end to the hook $T^2$, and passes upward through a pulley, $V^2$, and thence to the spring D, by which means the hook $T^2$ will be raised up and be disconnected from the door C by the reaction of the spring when it is released.

By this arrangement, when the barn catches fire, just as soon as the flame or heat reaches any part of the rod or chain $a$ and melts one or more of its fusible joints, the spring D will be released, and thus enable the rod F to be drawn backward by the spring H, unhitch the animals from their stalls and leave them free, and at the same time raise the latch or hook $T^2$, and permit the door C to be opened by the weight $U^3$ and give the animals exit from the burning barn.

The fusible portions of the rods, chains, or ropes $a$ may be made in any suitable manner, either by soldering the ends of short metal rods together, where rods are used, or inserting fusible or other combustible links or joints in the chain, when chains are used. When ropes are used, they may be made smaller at short intervals, or weakened in any other manner, and saturated with some inflammable material. Ropes, however, are objectionable in some respects, as they become weakened by age, and are affected by the weather when exposed. Short metal rods soldered together at their ends, and with chains connecting them where they run over or around the pulleys, will be the most practicable for the purpose. The fusible joints will be placed as close together as necessary—usually every two or three feet—and the fusible rods will be arranged to encircle the building at all parts, so that the fire can only burn a very short time before severing some part of the rod, and thus cause the spring D to open the door C and unhitch the animals.

As before stated, the rods $a$ may be arranged either inside or outside the building, or partially inside and partially outside.

A bell or gong, W, is also arranged to be acted upon by the spring D, to give an alarm at the same time that the door is opened and the animals released, so that the attendants or other persons may be notified of the fire. The bell W may be placed at a distance from the barn, if desired, or near to or within the house or sleeping-apartments of the owner or others having charge of the barn.

The fusible rod $a$ may be arranged to encircle and inclose the barn as many times as or in any manner desired, and may be connected to as many stalls or hitching-places as there are animals in the barn.

The door-catch T' $T^2$ and the halter-catches $z'$ $z^2$ M may be arranged to be disconnected when not required, so as not to interfere with the ordinary uses of the barn or its attachments.

Weights may be used in place of the springs D H, if desired, and springs may be used in place of the weight $U^3$.

The door C is shown as sliding; but of course the apparatus is equally applicable to doors operated in any other manner.

Having described my invention and set forth its merits, what I claim is—

1. The combination, with a stable or other place where animals are confined, of a windlass, $b$, rods, ropes, or chains $a$, having fusible sections encompassing said stable, and connected by one end to said windlass and at the other end to a spring, D, pulleys over which said rods, ropes, or chains are adapted to run when passing around angles, and a door, C, connected to said spring by a rope or chain and a catch, the latter adapted to be disconnected by the reaction of said spring, whereby the parts co-operate in the manner and for the purpose substantially as set forth.

2. The combination, with a stable or other place where animals are confined, of a windlass, $b$, rods, ropes, or chains $a$, having fusible sections encompassing said stable, and connected by one end to said windlass and at the other end to a spring, D, pulleys over which said rods, ropes, or chains are adapted to run when passing around angles, a door, C, connected to said spring by a rope and catch, the latter adapted to be disconnected by the reaction of said spring, and means for connecting the hitching-straps of the animals with said spring, whereby the reaction of the spring will release the animals, substantially as and for the purpose set forth.

3. The combination, with a stable or other place where animals are confined, of a windlass, $b$, rods, ropes, or chains $a$, having fusible sections encompassing said stable, and connected at one end to said windlass and at the other to a spring, D, pulleys over which said rods, ropes, or chains are adapted to run when turning angles, and an alarm, W, adapted to be sounded by the reaction of said spring, substantially as and for the purpose set forth.

In testimony whereof I have hereunto set my hand in presence of two subscribing witnesses.

WILLIAM DONLON.

Witnesses:
  C. N. WOODWARD,
  LOUIS FEESER, Sr.